Figure 1:
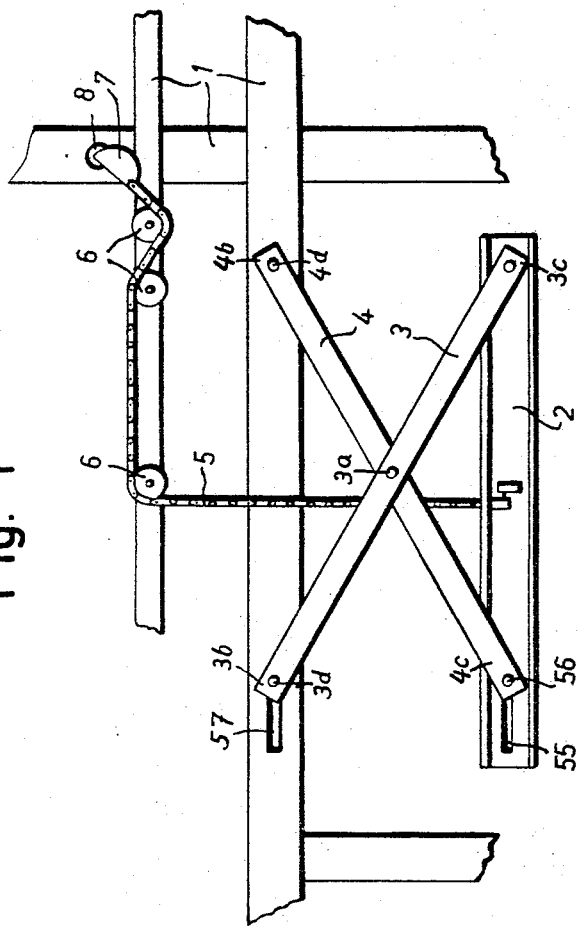

Aug. 1, 1967 A. SCHMID 3,333,849
APPARATUS FOR TESTING THE POSITION AND FOR RAISING
THE BOWLING PINS IN A PIN SETTING MACHINE
Filed Nov. 4, 1964 6 Sheets-Sheet 6

INVENTOR
August Schmid
BY Werner W. Kleeman
ATTORNEY

United States Patent Office 3,333,849
Patented Aug. 1, 1967

---

3,333,849
APPARATUS FOR TESTING THE POSITION AND FOR RAISING THE BOWLING PINS IN A PIN SETTING MACHINE
August Schmid, Schwerzenbach, Switzerland, assignor to Patentverwertungs- und Finanzierungsgesellschaft Serania A.G., a corporation of Switzerland
Filed Nov. 4, 1964, Ser. No. 408,847
Claims priority, application Switzerland, Nov. 11, 1963, 13,803/63
7 Claims. (Cl. 273—42)

The present invention has reference to an improved apparatus for testing or scanning the position of standing bowling pins as well as for raising such standing pins in an automatic, cableless pin setting machine by means of displaceable pin pick-up or gripper devices incorporating gripper arms provided to engage about the neck of the bowling pins, with each pair of gripper arms being pivotable about a common pivot shaft or axis.

According to certain types of bowling the governing bowling rules require that the bowling pins which have remained standing after a first throw of the bowling ball remain exactly in such position for the bowling of a second ball and, if these standing pins are raised in order to sweep the bowling alley of deadwood after having bowled the first ball, then such raised pins must again be placed or "spotted" at the same location they assumed after bowling the first ball. This means that those bowling pins which remained standing after the throw of the first ball, but which were somewhat displaced out of their correct position or "spot," must be exactly located at such displaced position for the second throw of the bowling ball. When the deadwood or knocked-down bowling pins are manually removed from the alley such does not present any problem, since it is merely necessary for the pin boy to remove the deadwood from between the standing pins after the bowler has bowled the first ball. With so-called cableless, automatic pin setting machines this technique is not possible since, in this case, there is employed a wiper element extending over substantially the entire width of the bowling alley for sweeping the alley clean of the deadwood; this wiper would thus also contact the standing bowling pins. Hence, with these automatic pin setting machines employing such a wiper element the pins still standing after the throw of the first ball are raised, whereafter such wiper element sweeps the bowling alley of the deadwood or knocked-down pins.

The present invention, therefore, has for one of its primary objects to provide an improved apparatus which effectively permits raising of the bowling pins still standing after the throw of the first bowling ball and repositioning such raised pins, after sweeping the bowling alley of deadwood, exactly at the location they assumed prior to being raised.

Another important object of the present invention is directed to the provision of a relatively simple, trouble-free operating gripper apparatus which fixedly retains bowling pins which may have been displaced within a certain area in such displaced position such that they can be exactly raised from their eventual displaced position, and upon completion of sweeping of the alley of deadwood these pins are again deposited exactly at their prior assumed position, whether such pins were previously displaced or not.

A further important object of this invention resides in the provision of an improved apparatus for testing or scanning the position of standing bowling pins, raising such pins, and exactly re-depositing said pins at the same location they assumed prior to raising thereof, this apparatus being relatively inexpensive to manufacture, relatively simple in construction, and operates in a very reliable and extremely troublefree manner.

There are pin gripper apparatuses already known to the art which are used to raise the standing bowling pins from the surface of the alley, yet such have the disadvantage that they require a complicated and expensive mechanism, and even in actual practice neither function satisfactorily nor exactly.

The inventive apparatus not only operates extremely reliably and with a high degree of precision, it also can do such with mechanism which can be considered relatively uncomplicated and inexpensive in comparison with comparable prior art devices. More specifically, the apparatus of the present invention incorporates a pin pick-up or gripper device for each bowling pin which is to be raised, each such pick-up or gripper device incorporating a pair of cooperating gripper arms mounted to be pivotable about a common pivot shaft. According to an important feature of this invention a pinon or driver is seated upon the pivot shaft for the gripper arms, this pinion being fixedly connected for rotation with a sprocket gear or wheel. Moreover, such pinion engages with a gear or gear segment seated upon one gripper arm, this gear or gear segment being hingedly connected by means of a lever to the second gripper arm of the pin pick-up device.

Figure 2:
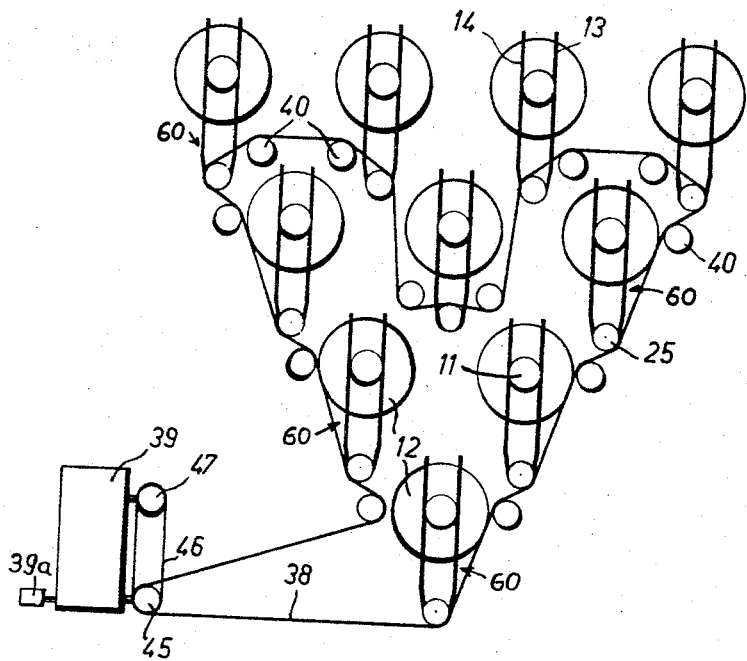
Figure 3:
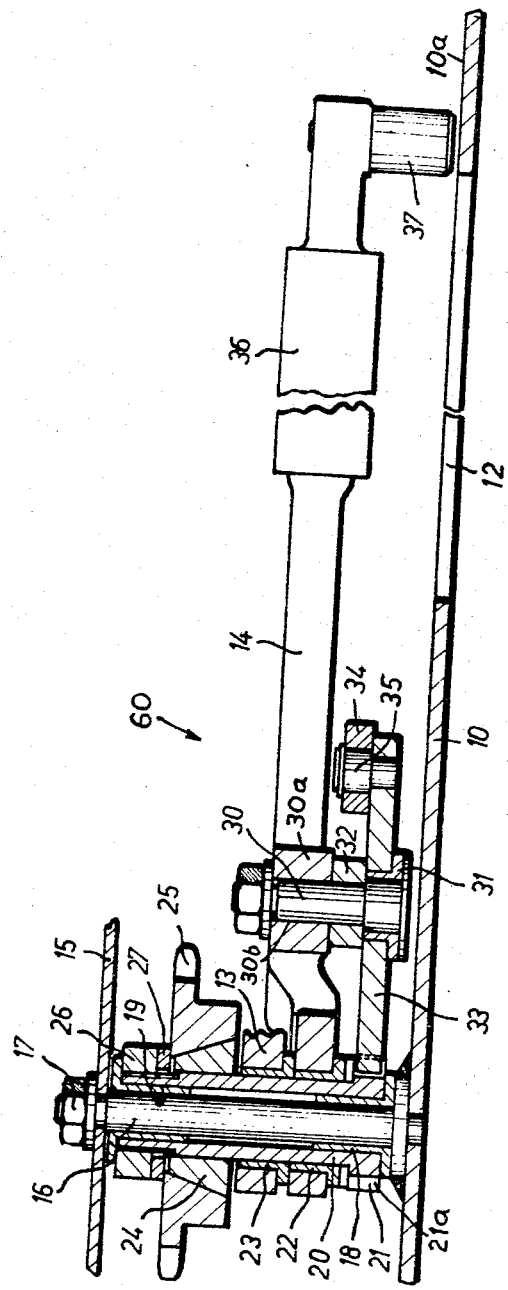
Figure 4:
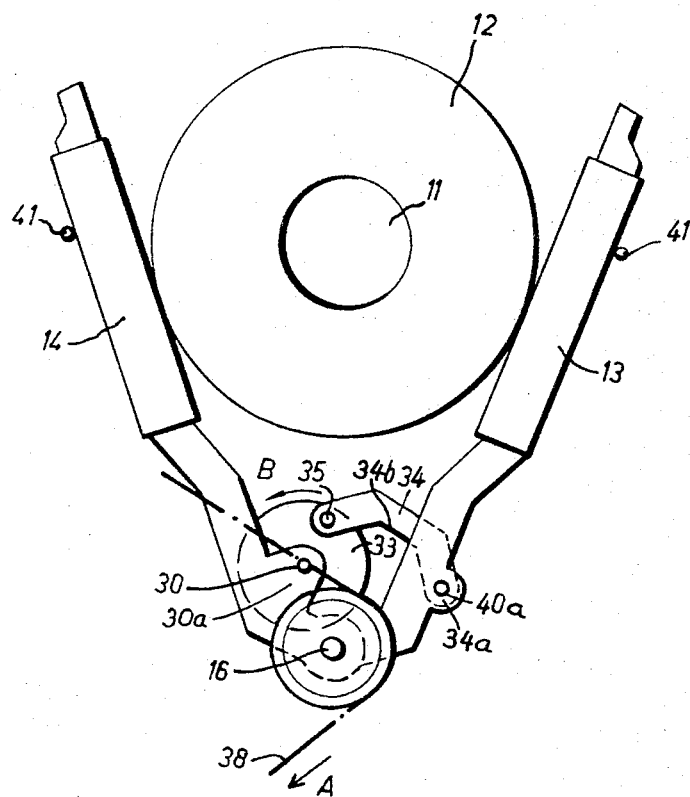
Figure 5:
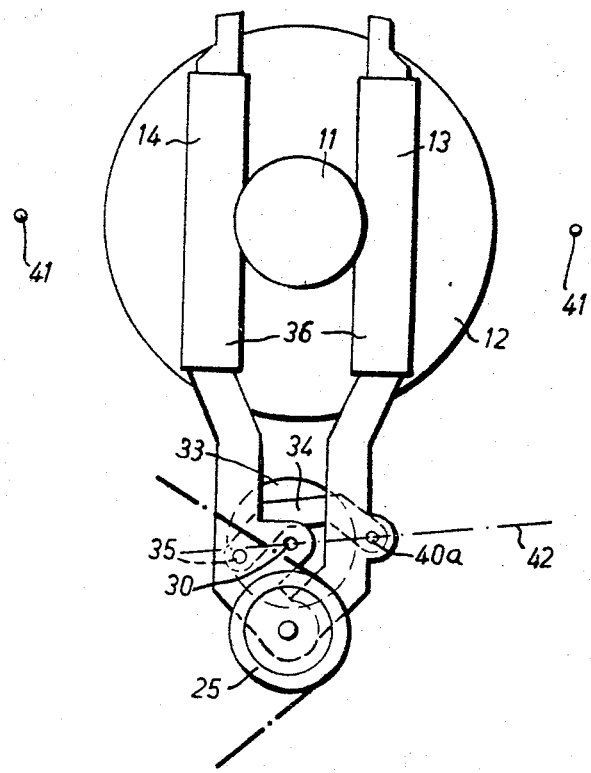
Figure 6:
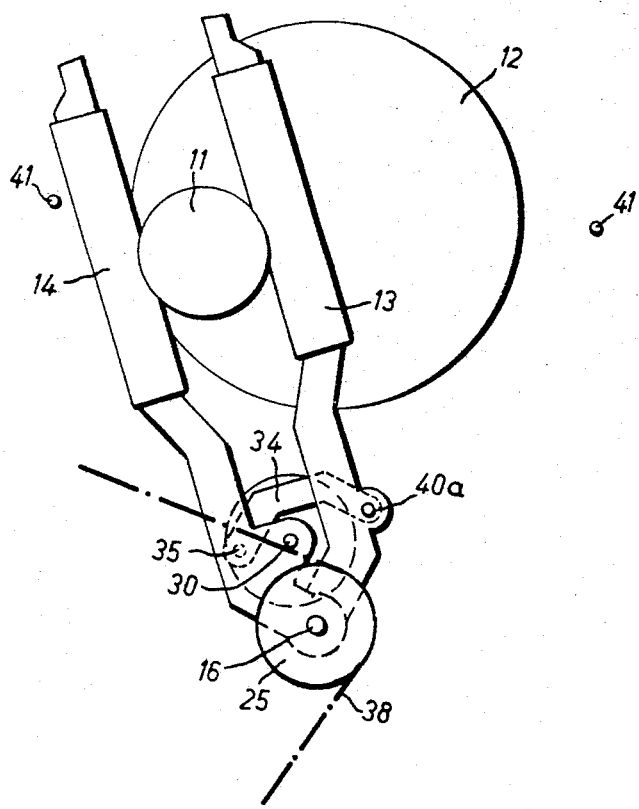

Other features, objects and advantages of the invention will become apparent by reference to the following detailed description and drawings in which:

FIGURE 1 schematically illustrates an up and down movable pin setting carriage in which the pin pick-up or gripper devices, each incorporating pairs of gripper arms, are held;

FIGURE 2 schematically illustrates a top plan view of the pin pick-up or gripper devices incorporating cooperating pairs of gripper arms, and further illustrating the drive mechanism for such pin gripper devices;

FIGURE 3 is a vertical cross-sectional view taken through a single pin pick-up or gripper device associated with a bowling pin;

FIGURE 4 schematically depicts details of the pair of cooperating gripper arms of the inventive pin gripper device, with the aforesaid arms shown in open position;

FIGURE 5 schematically depicts the pair of cooperating gripper arms of the inventive pin gripper device, with the aforesaid arms being depicted in closed position, the bowling pin being centrally located or upon its "spot"; and FIGURE 6 illustrates a pair of cooperating gripper arms of the inventive pin gripper device, with the gripper arms located in closed position and with the bowling pin in displaced position or "off-spot."

It is to be appreciated that the inventive apparatus is employed in an automatic, cableless pin setting machine. Under the term "cableless pin setting machine" there is to be understood such an installation in which the bowling pins are not raised by means of cables after the throw of a bowling ball or pulled-back into their place of erection by means of cables connected to the base of the aforesaid bowling pins.

Describing now specifically FIGURE 1 of the drawings, it will be seen that a pin setting carriage 2 is mounted for up and down movement at a stationary frame 1. More precisely, rods or strut members 3, 4 which cross at their central region and there pivotably connected together by a pivot bolt 3a in scissor-like fashion are used for providing the necessary mounting enabling such up and down movement. Furthermore, one end 3b of the strut member 3 is pivotably and slideably connected at bolt 3d or the like in a slot 57 of the stationary frame 1, whereas the other end 3c of this strut member is pivotably connected with the displaceable carriage 2. In much the same manner, the strut member 4 has one end 4b pivotably connected at bolt 4d or the like with the frame 1 and the other end 4c pivotably and slideably connected in a slot 55 of the carriage 2, a bolt 56 or the like mounted to such other end 4c riding in this aforesaid slot 55.

The described connection of the strut members 3, 4 with the displaceable carriage 2 and stationary frame 1 is effected such that, it is possible for this carriage 2 during its up and down movement to always remain in horizontal or substantially horizontal position. Moreover, such up and down movement of carriage 2 is brought about by a lifting element, e.g., chain means 5 which, in turn, is guided over deflecting wheels or gears 6 to an eccentric 7. This eccentric 7 is rigidly connected with a rotatable shaft 8. During rotation of the shaft 8 the chain means 5 is wound-up or wound-off the associated eccentric 8, depending upon the sense of rotation of the shaft 9, carriage 2 is thereby raised or lowered.

It will be appreciated that a similar arrangement of strut members 3, 4, chain means 5 and eccentric 7 is provided at the opposite side of the carriage 2, and since such arrangement is similar to that just described, it is not thought necessary to further consider the same. In fact, the specific details of the arrangement and mounting of the carriage 2 do not constitute the inventive subject matter of the present application, having been described and claimed in my co-pending United States application Ser. No. 408,889, filed Nov. 4, 1964, entitled, "Apparatus for Setting Bowling Pins Upon a Bowling Alley," and reference be had thereto for further details, if such is deemed desirable.

By referring now to FIGURES 2 and 3, it will be seen that a plurality of pin gripper or pick-up devices, generally designated by reference numeral 60, and each incorporating cooperating pairs of gripper arms 13, 14 are located upon a base plate 10 of the pin setting carriage 2. A respective pair of such cooperating gripper arms 13, 14 are operably associated with each bowling pin 11. Moreover, openings 12 are provided at the base plate 10, the position of each such opening exactly corresponding to the correct position of the arrangement of the bowling pins upon the pin spotting or setting section of the non-illustrated bowling alley. The diameter of each opening 12 is about three times the diameter of the head of a bowling pin 11.

The cooperating gripper arms 13, 14 which together form a type of clamp-like pair of gripper arms, are each independently rotatable about a common vertical shaft 16 and are constructed to open and close independent of their rotational position. These gripper arms 13, 14 of each pin gripper device 60 serve to scan or test the position of the associated standing bowling pins 11, thereafter fixedly clamping the neck of such associated bowling pin, so that said bowling pin together with the pin setting carriage 2 can be raised prior to removing the fallen bowling pins or deadwood from the bowling alley and, thereafter can again be precisely deposited at their exact previous position upon the alley. As will be readily understood by those skilled in the art, when the carriage 2 is raised the pins knocked-down after the throw of the first bowling ball are swept-off the alley by means of a wiper element or the like and into a trough or chute located behind the bowling alley.

The gripper mechanism for each pin gripper device 60 is advantageously constructed such that not only those pins which have remained standing at their correct position are engaged, rather also those pins which have been somewhat displaced with regard to their correct or initially "spotted" position. Since the construction of the individual pin gripper or pick-up devices 60 is the same, the description hereafter will mainly be directed to the details of one such pin gripper device, reference now being made more specifically to FIGURES 3 to 6 showing in detail the physical structure of the gripper mechanism.

Now, by inspecting such figures it will be noted that a non-rotatable shaft 16 is rigidly held by means of screws 17, or other suitable fastening member, between the base plate 10 and a cover plate 15. At the upper and lower end of this shaft 16 there is mounted a respective internal sleeve 18, 19 advantageously formed of a wear resistant plastic, for instance nylon. The elongated hub 20 of a driver means 21 provided with teeth 21a is pushed-onto these inner sleeves 18, 19. By means of this elongated hub 20 the gripper or pick-up arms 13 and 14 of the pin gripper device 60 are pivotably supported through the agency of a respective bushing 23 and 22. A sprocket wheel or gear 25 rigidly connected for rotation with the hub 20 is seated upon a tapered sleeve or socket 24 above the gripper arm 13. The entire aforedescribed arrangement is secured against axial displacement by means of a threaded nut 26 and a support disk 27.

A lug or boss 30a provided with a bore 30b in which there is located a bolt 30 is seated at the gripper arm 14 (see FIGURES 3 and 4). This bolt 30 together with a bushing 31 and a spacer 32 carries a gear member 33, such as for instance a gear or gear segment, the teeth of which mesh with the driver gear or pinion 21. The gear member 33 advantageously possesses a threefold greater diameter than the driver gear 21. This rotatably mounted gear member 33 carries at one location removed from the point of engagement with the aforesaid driver gear means 21 an actuating lever 34 pivotably mounted upon a bolt member 35.

The outer or outwardly extending portion of each gripper arm 13, 14 is provided with a respective flexible pad or cushion 36 at the region thereof contacting or bearing against the associated bowling pin 11. The outermost free end of each gripper arm 13, 14 lightly bears against the upper face 10a of the base plate 10 by means of a respective foot or contact piece 37.

As previously explained, the openings 12 which extend substantially concentrically with respect to the correct "spotting" position for the associated bowling pins 11 are located at the base plate 10. The sprocket wheels 25 of all pin gripper devices 60 are operatively connected with a common driving chain 38 communicating with a suitable drive mechanism 39 (FIGURE 2). This drive mechanism 39 causes common rotation of the sprocket wheels 25 in one or the other rotational senses. In addition to the sprocket gears or wheels 25, deflecting wheels or gears 40 are also associated with the endless chain element 38 and serve to deviate or deflect said chain as it moves from one sprocket wheel 25 to the other.

An inspection of FIGURE 4 will clearly reveal that the actuating lever 34 is operably connected via a bolt 40a with the gripper arm 13 at its end 34a facing away from the bolt member 35. This actuating lever 34 is advantageously offset or provided with a suitable recess, as generally indicated by reference character 34b, in order to provide sufficient spacing from the spacer 32. Furthermore, in FIGURE 4 there is shown the open position of both gripper arms 13 and 14, in this position such gripper arms come to bear against a respective stop or impact member 41.

The mode of operation of the heretofore described pin pick-up or gripper device 60 is as follows:

Starting from the open position of the gripper arms 13, 14 of FIGURE 4 and assuming that the bowling pin 11 to be seized is located in its central or correctly "spotted" position, the chain 38 is driven in the direction of the arrow A. This causes rotation of the associated sprocket wheel 25 about the stationary shaft 16. Due to the rotation of this sprocket wheel 25 and the driver gear 21 rigidly connected for rotation therewith, there results rotation of the gear member 33. Depending upon the prevailing frictional conditions either the gripper arm 13 or the gripper arm 14 begins to move in a direction towards the associated bowling pin 11. However, it is also possible that both gripper arms 13 and 14 simultaneously pivot in consequence of this rotational movement of the gear member 33.

Let it, however, be assumed that the gripper arm 14 remains stationary while, on the other hand, the gripper arm 13 moves at such time as the gear member 33 rotates in the direction of the arrow B. Since the gripper arm 14 at this time is considered to be stationary, a rocking of the gripper arm 13 results until such bears against the neck of the bowling pin 11. Now, with further rotation of the gear member 33 the gripper arm 13 cannot move further, as a result, the gripper arm 14 is now pulled in the direction of the neck of the bowling pin 11, until finally the closed position of the gripper arms 13 and 14 is reached, such being shown in FIGURE 5, where both gripper arms 13, 14 compactly engage about the neck of the associated bowling pin 11 and thereby permit raising of such pin. In this closed position of the gripper arms 13 and 14 the axes of the bolt members 40a, 30 and 35 approximately intersect or pass through a straight line 42, whereby this position, designated as the deadpoint position, is advantageously slightly exceeded by the bolt member 35, as best seen by referring to FIGURE 5, where the axis of this bolt member 35 does not pass exactly through the straight line 42.

The mode of operation of the gripper device 60 when engaging a bowling pin 11 which has been displaced from its original spotted position is essentially the same, such condition being shown in FIGURE 6, with only one gripper arm coming to bear against the bowling pin in point of time before the other, and in consequence thereof the aforesaid other arm must carry out a larger pivoting movement than if the original position of the bowling pin had not changed.

During raising of the pin setting carriage 2 both free ends 37 of the gripper arms 13 and 14 press against the base plate 10 under the weight of the supported bowling pin 11, whereby the temporarily assumed position of these gripper arms after they have closed is fixed. After such raising operation and the subsequent lowering of the bowling pin or pins 11 upon the bowling alley the chain member 38 is driven in the opposite direction, so that the sprocket wheel 25 also rotates in the opposite direction of rotation. Consequently, the gripper arms 13 and 14 spread apart and again assume the starting position depicted in FIGURE 4. This takes place at the same time for all bowling pins. Small differences in the terminal position of the gripper arms 13, 14 resulting from the kinematics of the drive, depending upon whether the gripper arms engage a pin which is disposed centrally or eccentrically of its "spot," are compensated by means of the elastic pads or cushions 36 provided at the aforesaid arms 13, 14.

In order to prevent that the pins fall down during this testing and gripping operation, or that they will be further displaced, each bowling pin during the closing movement of the gripper arms 13, 14 is pushed from the top onto the bowling alley, during lowering of the pin setting carriage 2, by means of an associated pressure plate (not shown). Such pressure plates are arranged internally of the carriage 2 above the associated pin gripper device 60, in a manner well known to those skilled in the art and for such reason not further explained herein. However, reference can readily be made to my co-pending United States application, Ser. No. 408,890, filed Nov. 4, 1964, entitled, "Bowling Pin Holder Device," depicting details of such a pressure plate suitable for the purposes of the present invention.

The actuation of the chain means 38 may occur, for example, by means of a special adjustment or displacement mechanism, preferably in dependence upon the elevational position of the carriage 2, so that this chain means during lowering of the carriage is driven in one direction and during raising thereof is driven in the other direction, with the gripper arms 13, 14 being opened or closed as required.

Moreover, actuation of the driving element, e.g., chain 38 can either take place by purely mechanical drive apparatus, which is effected by the to and fro movement of the bolt 56 riding in the slot 55 of the carriage 2 or, however, an electric motor, such as the drive motor 39 of FIGURE 2, can be provided which rotates forwardly or backwards by means of a control pulse delivered via a switch 39a (FIGURE 2) which is actuated by the displaceable bolt 56, in order that the driving chain for the gripper arms can be pulled in one or the other direction, and thereby the gripper arms opened or closed. Moreover, in place of a chain 38 it would also be possible to use a cable, band or equivalent expedients.

While there is shown and described a present preferred embodiment of the invention it is to be distinctly understood that the invention is not limited thereto but may be otherwise variously embodied and practised within the scope of the following claims.

What is claimed is:

1. Apparatus for testing the position of standing bowling pins and for raising such bowling pins at an automatic cableless pin setting machine, comprising a pin pick-up device provided for each bowling pin whose position is to be tested, each pin pick-up device incorporating a pair of cooperating displaceable gripper arms adapted to engage about the neck of an associated bowling pin, a common shaft member to which said pair of cooperating gripper arms are pivotably connected, a driver mounted for rotation upon said common shaft, a sprocket gear rigidly connected for rotation with said driver, a gear member carried by one of the gripper arms and meshing with said driver, and lever means for operatively connecting said gear member with the other gripper arm.

2. Apparatus as defined in claim 1 wherein said driver comprises a pinion.

3. Apparatus as defined in claim 1 wherein said gear member is a gear segment.

4. Apparatus as defined in claim 1 wherein said gear member is a gear.

5. Apparatus as defined in claim 1 including a pivot shaft for rotatably supporting said gear member, a fastening bolt for articulating said lever means with said other gripper arm, said pivot shaft and fastening bolt approximately passing through a common straight line when said pin pick-up device is in its closed position for engaging the associated bowling pin, a common chain means for operably interconnecting in driving relation the pairs of cooperating gripper arms of all of the pin pick-up devices.

6. Apparatus as defined in claim 1 including endless chain means for driving the gripper arms of said pin pick-up devices, and deflecting gear means arranged between the respective sprocket gears of each two neighboring pick-up devices for guiding said endless chain means from one pick-up device to the next.

7. Apparatus for testing the position of standing bowling pins and for raising such bowling pins at an automatic cableless pin setting machine, comprising a pin pick-up device provided for each bowling pin of a set in order to test the position of such bowling pins, each pin pick-up device incorporating a pair of cooperating displaceable gripper arms adapted to engage about the neck of an associated bowling pin, a common shaft member to which said pair of cooperating gripper arms are pivotably connected, a driver gear mounted for rotation upon said common shaft, a sprocket gear rigidly connected for rotation with said driver gear, a gear member carried by one of the gripper arms and meshing with said driver gear, lever means for operatively connecting said gear member with the other gripper arm, and means for driving said gripper arms into an open and closed position, respectively.

References Cited

UNITED STATES PATENTS

| 3,193,290 | 7/1965 | Dowd et al. | 273—43 |
| 3,219,345 | 11/1965 | Rogers | 273—43 |
| 3,245,684 | 4/1966 | Congelli et al. | 273—43 |

ANTON O. OECHSLE, *Primary Examiner.*